(12) United States Patent
McCarthy et al.

(10) Patent No.: US 8,938,520 B2
(45) Date of Patent: Jan. 20, 2015

(54) METHODS AND SYSTEMS FOR SMART ADAPTERS IN A SOCIAL MEDIA CONTENT ANALYTICS ENVIRONMENT

(75) Inventors: Kathi Loretto McCarthy, Saint John (CA); Mark Magennis, Saint John (CA)

(73) Assignee: salesforce.com, inc., San Francisco, CA (US)

( * ) Notice: Subject to any disclaimer, the term of this patent is extended or adjusted under 35 U.S.C. 154(b) by 183 days.

(21) Appl. No.: 13/594,469

(22) Filed: Aug. 24, 2012

(65) Prior Publication Data

US 2013/0262662 A1 Oct. 3, 2013

Related U.S. Application Data

(60) Provisional application No. 61/619,796, filed on Apr. 3, 2012.

(51) Int. Cl.
*G06F 15/16* (2006.01)
*G06F 17/30* (2006.01)

(52) U.S. Cl.
CPC .................................. *G06F 17/301* (2013.01)
USPC ............ 709/219; 709/224; 707/711; 707/770

(58) Field of Classification Search
USPC .......... 709/217, 219, 224; 707/737, 731, 758, 707/711, 770; 715/753; 705/27; 717/109
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |

(Continued)

*Primary Examiner* — Le H Luu
(74) *Attorney, Agent, or Firm* — Ingrassia Fisher & Lorenz, P.C.

(57) ABSTRACT

Methods and systems are provided for retrieving social media content metrics from a plurality of websites using a single multi-site adapter. The method includes constructing a respective plug-in for each website; constructing a database of M plug-ins corresponding to M websites, respectively; selecting a plug-in from the database; feeding the selected plug-in into the multi-site adapter; and applying the adapter to a particular website corresponding to the plug-ins to thereby retrieve the analytics (metrics) for pages on a website.

20 Claims, 4 Drawing Sheets

(56) References Cited

U.S. PATENT DOCUMENTS

| | | |
|---|---|---|
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0148588 A1* | 7/2004 | Sadiq ............................ 717/109 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0100962 A1* | 5/2007 | Barth et al. .................. 709/217 |
| 2010/0268623 A1* | 10/2010 | Barth et al. ...................... 705/27 |
| 2012/0150888 A1* | 6/2012 | Hyatt et al. .................. 707/758 |
| 2012/0179673 A1* | 7/2012 | Kelly et al. ................... 707/731 |
| 2013/0204874 A1* | 8/2013 | Frey ............................. 707/737 |
| 2013/0263019 A1* | 10/2013 | Castellanos et al. .......... 715/753 |

* cited by examiner

METHODS AND SYSTEMS FOR SMART ADAPTERS IN A SOCIAL MEDIA CONTENT ANALYTICS ENVIRONMENT

CROSS-REFERENCE TO RELATED APPLICATION

This application claims the benefit of U.S. provisional patent application Ser. No. 61/619,796, filed Apr. 3, 2012, the entire content of which is incorporated by reference herein.

TECHNICAL FIELD

Embodiments of the subject matter described herein relate generally to computer systems and applications for analyzing social media content and, more particularly, to the use of smart adapters in a social media content analytics environment.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Robust systems and applications for measuring and analyzing social media content metrics have been developed for use in the multi-tenant environment. Presently known analytics applications, such as the Radian6 system, gather metrics around blog posts, forum posts, video posts, and other social media points of interest. Relevant metrics include the number of public comments, the number of unique commenter names, number of views, and comment date. Several challenges accompany the gathering of metrics, including the endless variety of HTML page styles and the frequency with which changes occur to these pages. In the past the Radian6 system has employed a code-based approach to retrieving metrics, using a specific custom software adapter for each website under inspection.

In this regime custom adapters were configured as a Java class written to locate metrics on HTML pages. In addition to accomodating the unique stylization of each individual web page, the adapter must keep pace with page changes. What might work one day may not work the next day if the page's host or author changes the HTML design or migrates to another source. In order to track changes to a web page's HTML code, the adapter code base must be frequently updated. Because the Radian6 system covers thousands of feeds, translating to millions of posts, a Service Patch approach to updating custom adapters has been employed. However, this approach involves significant administrative overhead for the adapter developer, often requiring several days to qualify and stage the new code, and push the code changes to the appropriate servers.

Systems and methods are thus needed for retrieving metrics in a social media environment which avoid the latency associated with updating presently known custom adapters.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

DETAILED DESCRIPTION

Figure 1:
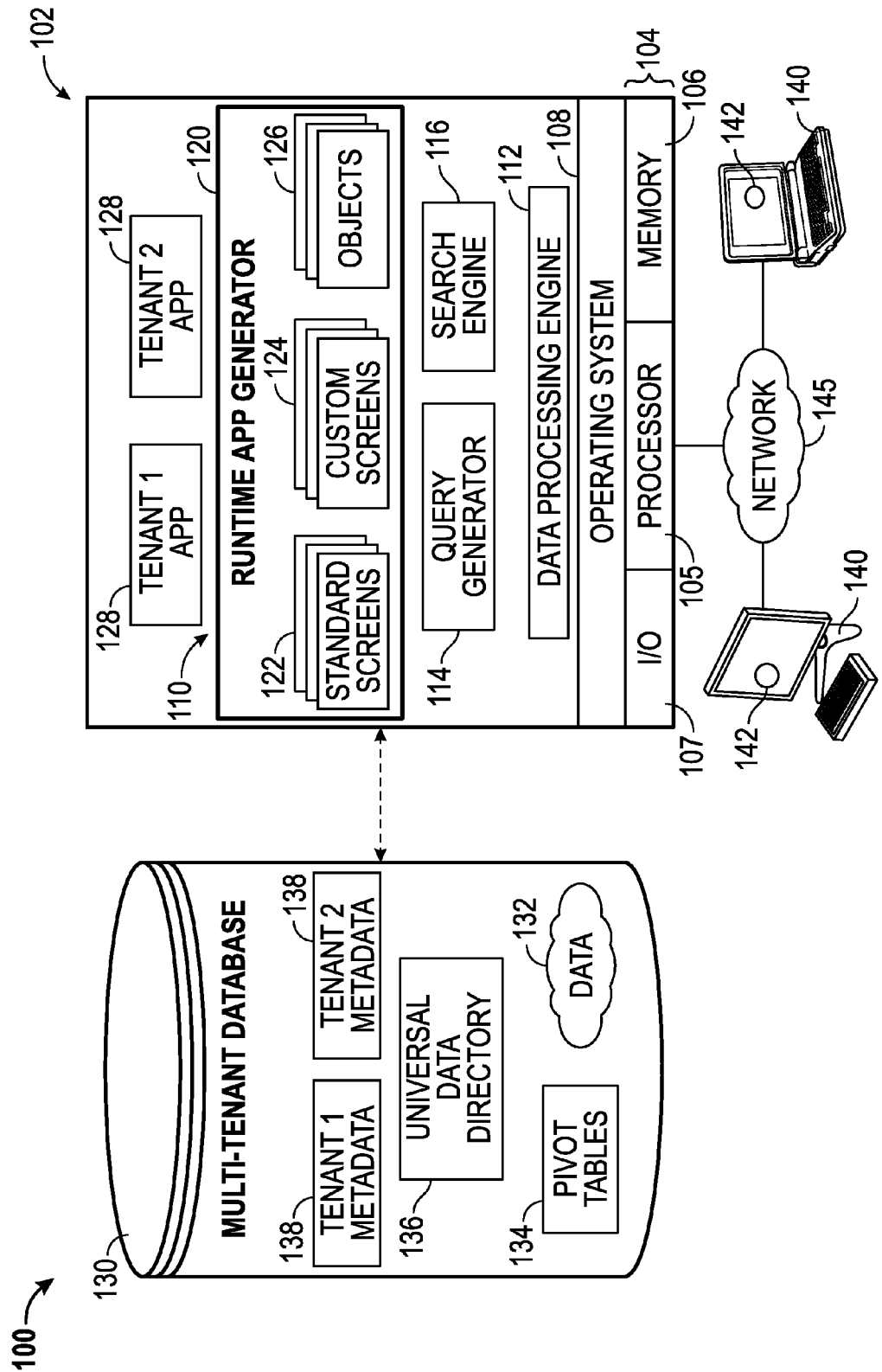
FIG. 1 is a schematic block diagram of a multi-tenant computing environment in accordance with an exemplary embodiment.

Embodiments of the subject matter described herein generally relate to a database driven architecture for a smart adapter system which includes a software adapter and a database of plug-ins for use with the adapter.

A method is provided for retrieving social media content analytics (also referred to herein as metrics) from a plurality of websites using a single multi-site adapter. The method involves constructing a respective plug-in for each website; constructing a database including of M plug-ins corresponding to the M websites, respectively (where M is a non-zero integer); selecting one of the plug-ins from the database; feeding the selected plug-in into the adapter; and applying the adapter to that particular website corresponding to the selected plug-in to thereby retrieve metrics from the site.

In an embodiment, the multi-site adapter (or smart adapter) includes N tags, each corresponding to a unique social media content metric, respectively, and each plug-in may be in the form of a Java script object notation (JSON) string. Each JSON string comprises N fields, wherein each field corresponds to a respective one of the adapter tags. That is, a preferred embodiment exhibits a one-to-one correspondence between the adapter tags, on the one hand, and the JSON string fields.

In this way, a plug-in may be processed by the adapter by feeding each field value of the JSON string into a respective tag in the adapter. This allows a single multi-site adapter, comprising a single code base, to service a large number of websites without having to modify the adapter code. Rather, each time a new website is interrogated, the adapter selects a specific plug-in from the database corresponding to the website under inspection, and reads the custom information for that particular website from the plug-in. When the information relating to the location and/or characterization of metrics for a website changes, the plug-in may be re-configured without having to modify the underlying adapter code.

In an embodiment, at least one of said N fields in each of the JSON strings may be formatted as a regular expression (regex) pattern, and the metrics (adapter tags and JSON fields) correspond to at least the following metrics: total comment count; top level comment count; author; date; number of unique authors; and number of likes. In one embodiment the number of metrics may be in the range of 5 to 25 or more, and the number of plug-ins in the database may be in the range of 10 to 500 or more, thus allowing many thousands of websites to be serviced by a single adapter.

The method further includes monitoring the websites to detect a change in the hyper text markup language (HTML) code relating to the metrics. In an embodiment, the monitoring involves polling a website to determine whether a predetermined metric has changed, for example by comparing a current value of a particular metric to a previously stored value for an inactive post. When the HTML code or other factor associated with metrics under inspection is determined to have been changed, for example, when the characterization or location of the metric is modified, the associated plug-in is re-configured (e.g., rewritten).

In an embodiment, the plug-ins may be constructed by defining the location and characterization of the metrics associated with the plurality of websites. In the context, the term 'characterization' refers to the language used by the website operator or HTML editor to describe a metric. For example, the following equivalent characterizations may be employed to describe the same metric: "comment count"; "total comments"; "total comment count"; "number of comments", and the like.

In accordance with this disclosure, plug-ins may be constructed by writing a regular expression (regex) pattern for each of the metrics. Thus, the database may be constructed by assembling an M×N database comprising M Java script object notation (JSON) strings, each having N fields or regex patterns, where N is in the range of 5 to 50, and M is any positive inntger.

A system for capturing media analytics from a plurality of websites is also provided. The system includes a multi-site adapter; a database comprising a plurality of plug-ins corresponding to the plurality of websites; and an application or software module configured to retrieve a predetermined plug-in from the database and plug it into the adapter to thereby facilitate capturing the analytics from a particular website.

In one embodiment, the multi-site adapter comprises computer code stored on or embodied in a computer readable medium such as a hard drive, removable drive, or network server, and the portal comprises and interactive user interface displayed on a computer monitor.

A smart adapter is provided for use with a database of plug-ins, each plug-in being associated with a corresponding website, for retrieving social media content metrics from the websites. The adapter includes a first module configured to select a plug-in from the database; a second module configured to process the contents the selected plug-in; and a third module for retrieving metrics from a website using the processed contents; wherein the first, second, and third modules comprise an integrated, non-transitory computer code base stored on a computer readable medium.

In an embodiment each plug-in comprises a Java script object notation (JSON) string having a plurality of regular expression (regex) patterns corresponding to a respective one of said metrics; the adapter comprises a plurality of fields corresponding to the regex patterns, respectively; and the adapter is configured to feed the regex patterns into the fields.

Turning now to FIG. 1, an exemplary multi-tenant system 100 includes a server 102 that dynamically creates and supports virtual applications 128 based upon data 132 from a database 130 that may be shared between multiple tenants, referred to herein as a multi-tenant database. Data and services generated by the virtual applications 128 are provided via a network 145 to any number of client devices 140, as desired. Each virtual application 128 is suitably generated at run-time (or on-demand) using a common application platform 110 that securely provides access to the data 132 in the database 130 for each of the various tenants subscribing to the multi-tenant system 100. In accordance with one non-limiting example, the multi-tenant system 100 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 130. In this regard, each tenant includes one or more users associated with, assigned to, or otherwise belonging to that respective tenant. Stated another way, each respective user within the multi-tenant system 100 is associated with, assigned to, or otherwise belongs to a particular one of the plurality of tenants supported by the multi-tenant system 100. Tenants may represent companies, corporate departments, business or legal organizations, and/or any other entities that maintain data for particular sets of users (such as their respective customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other tenants.

The multi-tenant database 130 may be a repository or other data storage system capable of storing and managing the data 132 associated with any number of tenants. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128, as described in greater detail below. The multi-tenant database 130 may alternatively be referred to herein as an on-demand database, in that the multi-tenant database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

Figure 2:
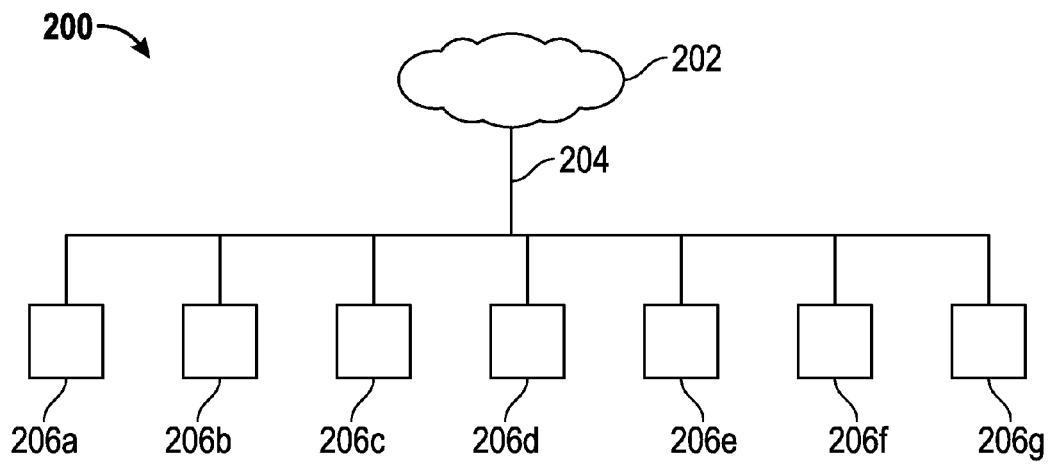
FIG. 2 is a schematic block diagram of a multi-tenant computing cloud configured to retrieve social media content analytics from a plurality of websites in accordance with an exemplary embodiment.

Referring now to FIG. 2, a system 200 for collecting social media content analytics includes a computing cloud 202 configured to retrieve metrics from a plurality of websites 206 in accordance with an exemplary embodiment. Cloud 202 may be of the type described above in conjunction with FIG. 1, and may be configured to access any number of websites 206(*a*)-206(*g*) over an Internet connection 204. Websites 206 may be any type of site from which data is monitored, retrieved, or collected. Exemplary sites may include news sites, blog sites, social media, and entertainment venues such as, for example, the Wall Street Journal (www.wsj.com), the New York Times (www.nytimes.com), the Huffington Post (www.huffingtonpost.com), and You Tube (www.youtube.com).

Robust systems currently exist for retrieving social media analytics and metrics from these websites, such as the Radian6™ product available from SalesForce.com inc. at www.radian6.com. In a preferred embodiment, the code-based adapter architecture typically employed by current systems is eschewed in favor of a database driven architecture, as described in greater detail below.

Figure 3:
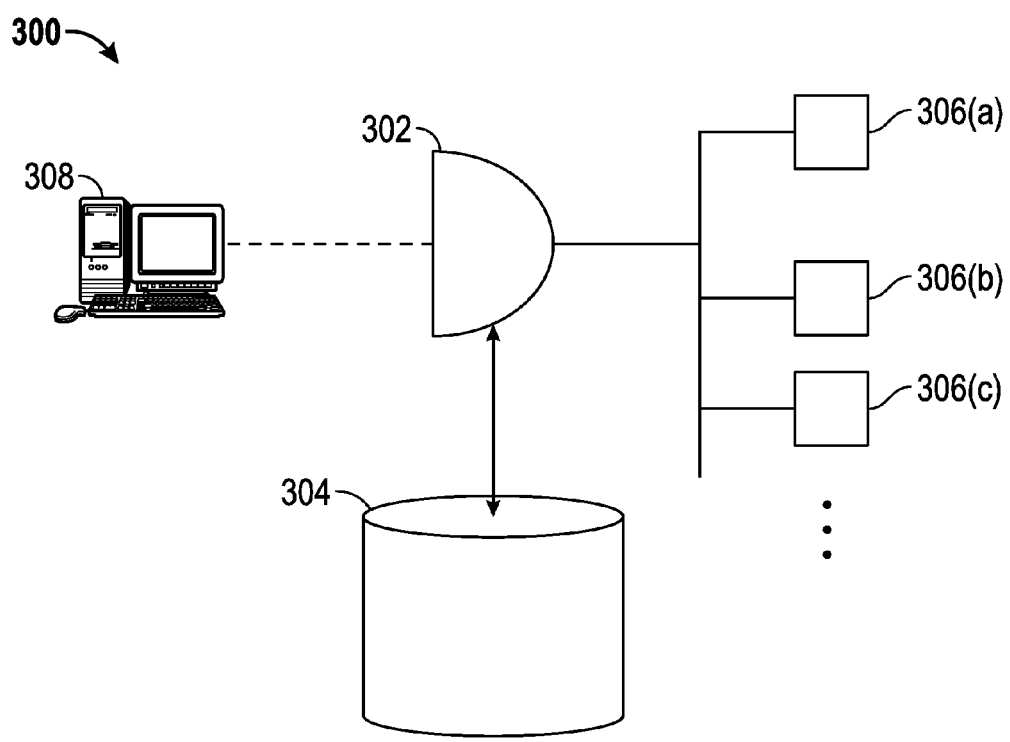
FIG. 3 is a schematic block diagram of a smart adapter and associated plug-in database for collecting metrics from a plurality of websites in accordance with an exemplary embodiment.

FIG. 3 is a schematic block diagram of a smart adapter system and method for collecting metrics from a plurality of websites in accordance with the present disclosure. More particularly, a multi-site adapter system 300 includes an adapter 302, a plug-in database 304, and a computer monitor (screen) 308 for presenting an operator with an interactive portal for managing the interaction between adapter 302, database 304, and a plurality of websites 306.

In an exemplary embodiment, adapter 302 comprises one or more modules of computer code embodied in a non-transitory form in a computer readable medium. Database 304 may include a plurality of plug-ins, or preconfigured blocks of code, each corresponding to a particular website. System 300 may be configured to select a particular plug-in for a particular website, and feed that plug-in into adapter 302 to facilitate retrieving metrics form that website.

One advantage of the database driven architecture described herein surrounds the ease with which changes to a website's HTML code (or a website's application protocol interface (API)) may be incorporated into the system. Succinctly, when a website changes the characterization or location of a metric on its web page, it is not necessary to modify the adapter code in order to accommodate the changes to the website. Rather, by updating the plug-in to accommodate the change to the web page, the smart adapter may retrieve metrics from the recently modified website in near real time, without the delay typically associated with qualifying a new version of adapter code.

Figure 4:
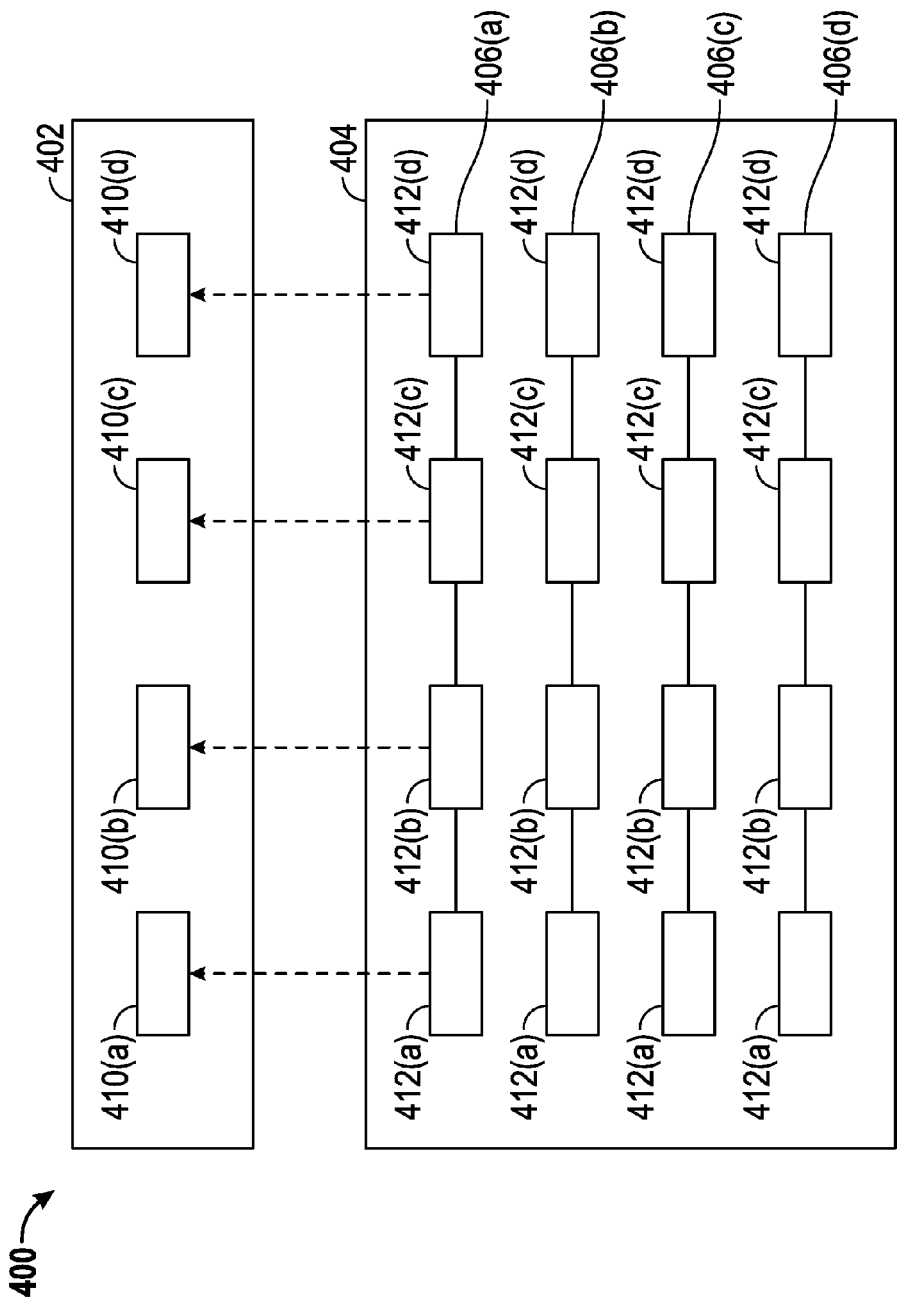
FIG. 4 is a schematic block diagram illustrating a plug-in database feeding website data into a multi-site adapter in accordance with an exemplary embodiment.

Referring now to FIG. 4, an exemplary database driven architecture 400 includes an adapter module 402 and a database structure 404. Adapter 402 includes a plurality of fields or tags 410(*a*)-410(*d*) representing individual metrics to be collected from various websites. For example, tag 410(*a*) may correspond to the total number of comments posted to a particular article, tag 410(*b*) may correspond to the number of unique commenters (authors), tag 410(*c*) may correspond to the number of "likes" posted to the article, and so on.

With continued reference to FIG. 4, database 404 includes a plurality of plug-ins 406(*a*)-406(*d*), each corresponding to a particular website or, alternatively, to a particular website template. In this context, the term 'website template' refers to a website, website page, group of websites, or group of pages within a website that share a common plug-in. Thus, a particular plug-in may work for a single website or multiple websites; alternatively, if different pages within a single website have different page styles or layouts, multiple plug-ins may be required to service the website.

For example, plug-in 406(*a*) may correspond to www.huffingtonpost.com, plug-in 406(*b*) may correspond to www.nytimes.com, and the like. Each plug-in 406 includes a plurality of fields 412(*a*)-412(*d*) corresponding to tags 410(*a*)-410(*d*), respectively. In an embodiment, each plug-in 406 may be formatted as a java script object notation (JSON) string, and each field 412 may be formatted as regular expression (regex) pattern or, alternatively, as an HTML tag name.

In operation, when it is desired to interrogate a particular website, the plug-in 406 corresponding to that website is selected from database 404, and the plug-in is fed into adapter 402. As shown by the dotted lines extending from database 404 to adapter 402, the contents of each field 412 is applied to its corresponding tag 410, which effectively customizes adapter 402 for a particular website. When it is desired to interrogate a different website, the contents of tags 410 are replaced with the corresponding fields 412 for the new website.

Figure 5:
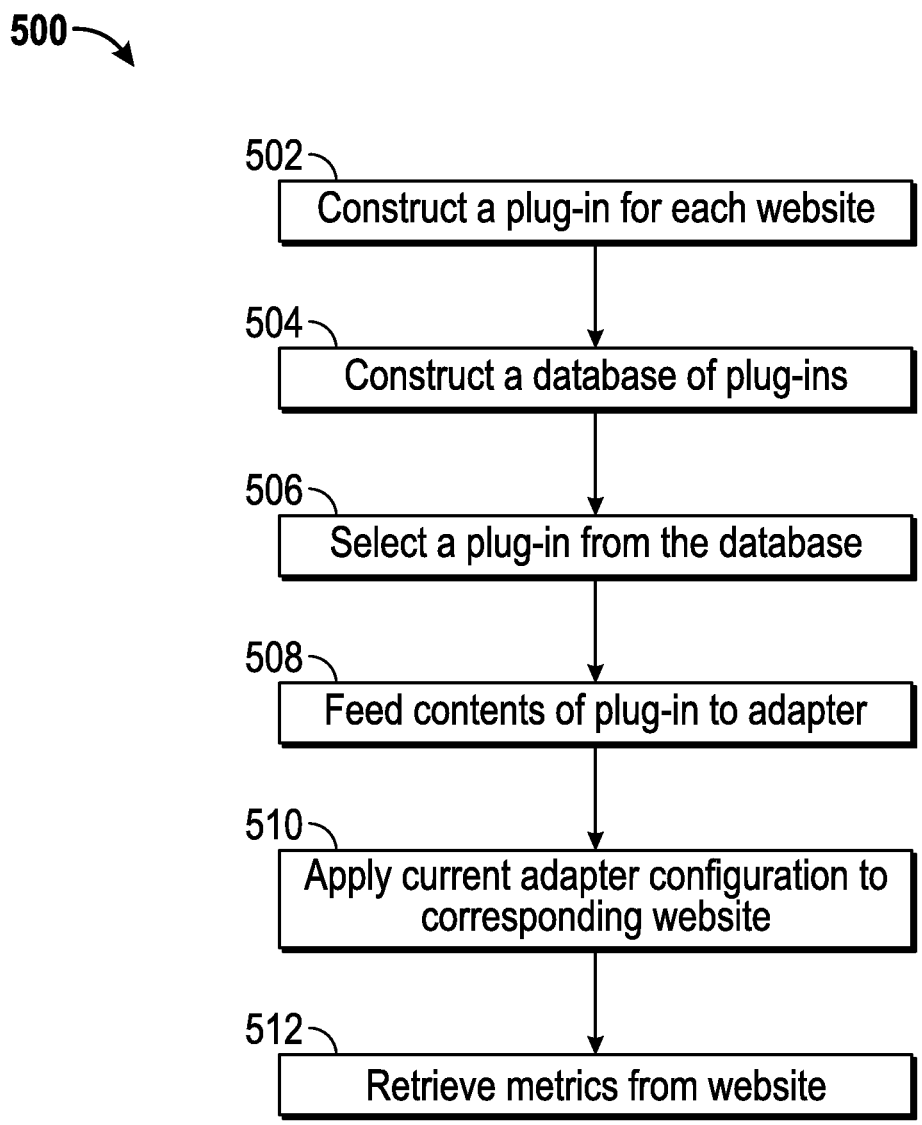
FIG. 5 is a flow chart illustrating a method of retrieving social media content metrics from a plurality of websites using a single smart adapter and a plug-in database in accordance with an exemplary embodiment.

Referring now to FIG. 5, a method 500 for retrieving social media content metrics from a plurality of websites using a single multi-site adapter involves constructing (task 502) a custom plug-in for each website; constructing (task 504) a database of M plug-ins corresponding to M websites, respectively; selecting (task 506) a plug-in from the database; feeding (task 508) the selected plug-in into the multi-site adapter; applying (task 510) the multi-site adapter to the particular website corresponding to the selected plug-in; and retrieving (task 512) metrics from the site.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of retrieving social media content metrics from a plurality of websites using a smart adapter, comprising:
constructing a respective plug-in for each of said websites;
constructing a database of M plug-ins corresponding to M websites, respectively, where M is a non-zero integer;
selecting one of said plug-ins from said database;
feeding said selected plug-in into said multi-site adapter to thereby customize the adapter for the selected plug-in; and
applying the customized multi-site adapter to a particular one of said websites corresponding to said selected plug-in to facilitate retrieving said metrics.

2. The method of claim 1, wherein said adapter comprises N tags, each corresponding to a unique one of said metrics, respectively, where N is a non-zero integer.

3. The method of claim 2, wherein each of said plug-ins comprises a Java script object notation (JSON) string.

4. The method of claim 3, wherein each of said JSON strings comprises N fields, wherein each of said N fields corresponds to a respective one of said N tags.

5. The method of claim 4, wherein at least one of said N fields in each of said JSON strings is in a regular expression (regex) format.

6. The method of claim 2, wherein constructing said database comprises constructing an M×N database comprising M Java script object notation (JSON) strings, each having N fields.

7. The method of claim 6, where N is in the range of 5 to 50, and M is a positive integer.

8. The method of claim 2, wherein each of said tags corresponds to one of the following metrics: total comment count; top level comment count; author; date; number of unique authors; and number of likes.

9. The method of claim 1, further comprising monitoring said websites to detect a change in the hyper text markup language (HTML) code relating to said metrics.

10. The method of claim 9, wherein monitoring comprises polling said websites to determine whether a predetermined metric has changed.

11. The method of claim 10, wherein polling comprises comparing a current value of said predetermined metric to a previously stored value of said predetermined metric.

12. The method of claim 11, wherein comparing comprises comparing said current and said previous values for an inactive post.

13. The method of claim 9, further comprising re-configuring the plug-in for those websites for which a change in the HTML code relating to said metrics is detected.

14. The method of claim 1, wherein constructing a respective plug-in comprises defining the location and characterization of said metrics for a particular one of said plurality of websites.

15. The method of claim 14, wherein constructing a respective plug-in comprises writing a regular expression (regex) pattern for each of said metrics.

16. A system for retrieving media analytics from a plurality of websites, comprising:
- a multi-site adapter module configured to be dynamically customized to access each one of the plurality of websites;
- a database comprising a plurality of plug-ins corresponding to said plurality of websites, respectively; and
- an application configured to retrieve a predetermined one of said plug-ins from said database and feed said predetermined plug-in into said adapter module to dynamically reconfigure the adapter module and thereby facilitate capturing said media analytics from a specified one of the plurality of websites corresponding to said predetermined plug-in.

17. The system of claim 16, wherein said multi-site adapter comprises computer code embodied in a computer readable medium.

18. The system of claim 16, wherein said system comprises an interactive user interface for display on a computer monitor.

19. A smart adapter for use with a database of plug-ins, each plug-in being associated with a corresponding website, for retrieving social media content metrics from said websites, the adapter comprising:
- a first module configured to select one of said plug-ins from said database;
- a second module configured to process the contents of said selected plug-in to thereby customize the adapter in accordance with the selected plug-in; and
- a third module for retrieving said metrics from one of said websites using said processed contents;
- wherein said first, second, and third modules comprise an integrated, non-transitory computer code base stored on a computer readable medium.

20. The adapter of claim 19, wherein:
- each of said plug-ins comprise a Java script object notation (JSON) string having a plurality of regular expression (regex) patterns corresponding to a respective one of said metrics;
- said adapter comprises a plurality of fields corresponding to said regex patterns, respectively; and
- said adapter is configured to feed said regex patterns into said fields.

* * * * *